Dec. 19, 1967  F. D. WELSCH ETAL  3,358,950
METHODS AND APPARATUS FOR DISCHARGING
PERSONNEL AND CARGO FROM VEHICLES
Filed Sept. 24, 1965  2 Sheets-Sheet 1
FIG. 1
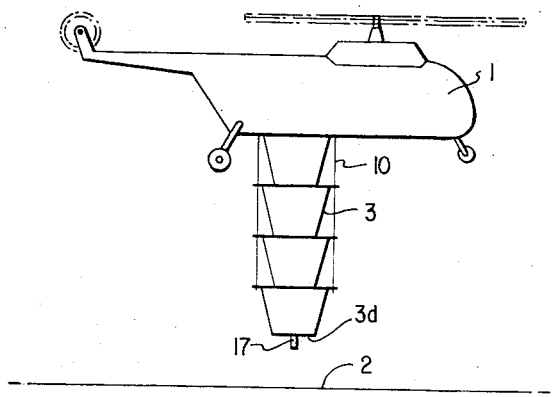
FIG. 4
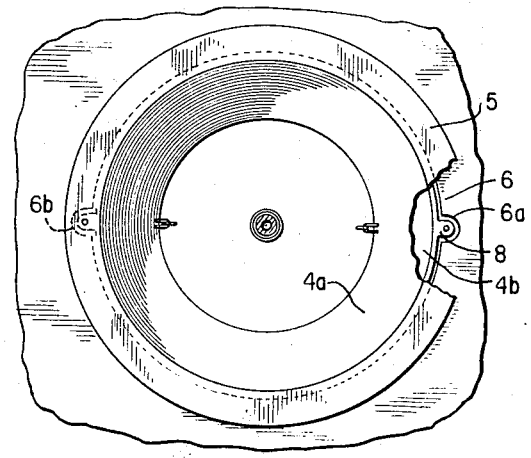
FIG. 5
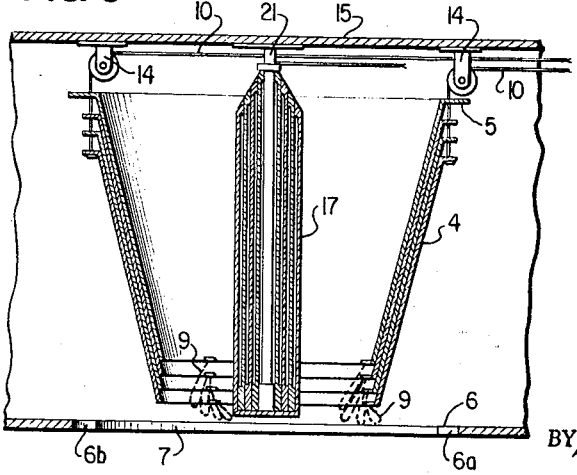
FIG. 6
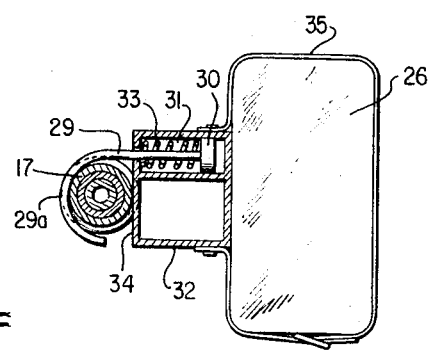
FIG. 7
INVENTORS.
F. DANIEL WELSCH
CLARENCE F. CARTER
BY Burns, Doane, Benedict, Swecker, & Mathis
ATTORNEYS.

Dec. 19, 1967   F. D. WELSCH ET AL   3,358,950
METHODS AND APPARATUS FOR DISCHARGING
PERSONNEL AND CARGO FROM VEHICLES
Filed Sept. 24, 1965   2 Sheets-Sheet 2
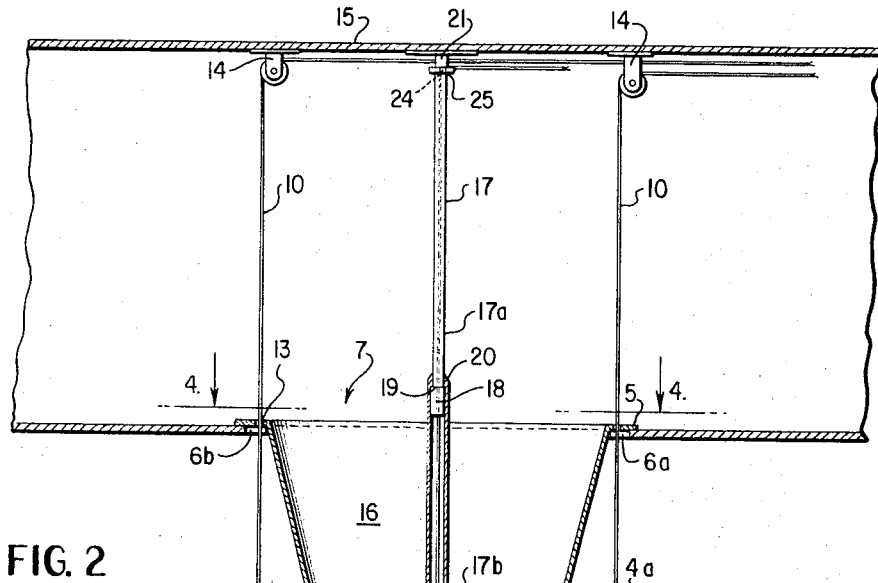
FIG. 2
FIG. 3
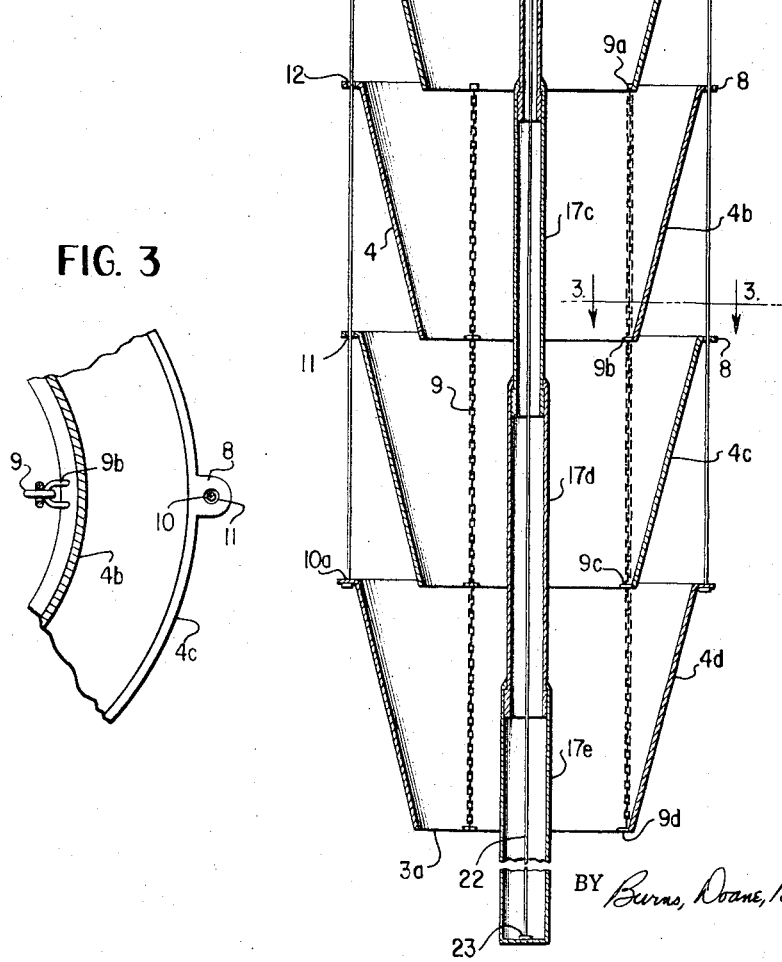
INVENTORS.
F. DANIEL WELSCH
CLARENCE F. CARTER
BY *Burns, Doane, Benedict, Swecker, & Mathis*
ATTORNEYS.

United States Patent Office 3,358,950
Patented Dec. 19, 1967

3,358,950
METHODS AND APPARATUS FOR DISCHARGING PERSONNEL AND CARGO FROM VEHICLES
Fred Daniel Welsch, McMullen Bldg., Suite 500, Danville, Ill. 61833, and Clarence F. Carter, Danville, Ill.; said Carter assignor to said Welsch
Filed Sept. 24, 1965, Ser. No. 489,887
12 Claims. (Cl. 244—137)

ABSTRACT OF THE DISCLOSURE

A method and apparatus for providing a lateral shield for troops and equipment during the gravity discharge thereof from a hovering aircraft at a controlled rate of descent.

---

This invention relates to methods and apparatus for discharging personnel and/or cargo from a vehicle. In particular, the invention relates to methods and apparatus which are particularly suited for discharging troops and equipment from a hovering aircraft, such as a helicopter, into a combat zone.

Helicopters are conventionally utilized in modern warfare as a device for transporting troops and equipment to a combat zone. However, in many combat zones, it has been found that troops and equipment are jeopardized when the helicopter attempts to land or hover close to the ground to allow troops and equipment to be moved from the helicopter to the ground.

It is an object of the present invention to provide methods and apparatus which minimize the dangers associated with transferring personnel and equipment from a vehicle to a spaced surface.

In particular, it is an object of the invention to provide methods and apparatus which improve the safety, speed and ease with which troops and equipment may be discharged from a hovering helicopter in a combat zone.

It is a further object of the invention to provide methods and apparatus for effectively shielding personnel and cargo being transported from a vehicle to a supporting surface.

It is likewise an object of the invention to provide methods and apparatus for allowing personnel and cargo to be moved from a vehicle to a spaced surface under the influence of gravity and without the aid of lowering devices such as winches, while maintaining control over this movement of personnel and/or equipment.

It is additionally an object of the invention to provide such methods and apparatus which enable personnel and equipment to be safely transferred from a helicopter to a ground surface without necessitating the landing of the helicopter.

Yet another object of the invention is to provide such methods and apparatus which afford means for automatically decelerating the movement of cargo between the vehicle and a surface.

It is also an object of the invention to provide such method and apparatus which are easily adapted to existing vehicle structures and which are particularly adapted to utilization in connection with conventional helicopters.

One method aspect of the present invention entails a method of discharging cargo from an aircraft. In this method, cargo is transported in the aircraft to a site above a selected location. The aircraft hovers above this location. The cargo is yieldably and resiliently engaged with support means whereby the cargo may slide downwardly from the hovering aircraft toward the preselected location. The rate of descent of the cargo along the support means is decelerated by increasing the resilient force with which the cargo is engaged with the support.

Another aspect of the invention relates to a method of discharging troops into a combat zone. In practicing this method, troops are transported in an aircraft to a site above a preselected location. The aircraft is hovered above the location. Troops are caused to slide downwardly along the support means from the hovering aircraft toward the preselected location. The troops are laterally shielded while they are sliding downwardly along the support means.

An apparatus aspect of this invention which is of individual significance entails a combination including a vehicle and means carried by the vehicle and adapted to define a support selectively extensible at least partially downwardly from the vehicle. This combination additionally includes gripping means and cargo means connected with the gripping means. A portion of the support adapted to be spaced from the vehicle is adapted to cooperate with the gripping means to increase the intensity with which the gripping means engages the support while sliding therealong.

A still further individually significant apparatus aspect of the invention relates to a combination comprising a hovering aircraft and means defining an at least partially shielded passage extending generally downwardly from the hovering aircraft. This apparatus concept, in further combination with means defining a support disposed at least partially within the passage and extending downwardly from the aircraft, affords a still further aspect of the overall invention.

Other noteworthy and individually significant aspects of the invention relate to structural details of the passage and the support defining means.

In describing the invention, reference will be made to preferred embodiments illustrated in the accompanying drawings. In the drawings:

FIGURE 1 is a schematic side elevation view of an aircraft hovering above a location with an extensible, passage-defining, shield projecting generally downwardly therefrom;

FIGURE 2 is an enlarged, fragmentary, and vertical section view of the passage-defining shield structure shown in FIGURE 1;

FIGURE 3 is a schematic, enlarged, and fragmentary view of a portion of the FIGURE 1 apparatus providing a sectional view of the passage-defining shield as viewed along the section line 3—3 of FIGURE 2;

FIGURE 4 is an enlarged, fragmentary view of an interior portion of the aircraft shown in FIGURE 1, illustrating in plan view the top of the passage-defining shield structure as viewed along the view direction 4—4 of FIGURE 2;

FIGURE 5 is a vertical, elevational, fragmentary, schematic and enlarged view of an interior portion of the FIGURE 1 apparatus, illustrating elements of the passage-defining shield which have been collapsed upwardly into the aircraft into nested relationship;

FIGURE 6 is a fragmentary, vertical and elevational view of a portion of an extensible slide or support structure extending downwardly within the shield shown in FIGURE 2 and schematically illustrating the manner in which cargo may be resiliently and slidably engaged with this support; and FIGURE 7 is an enlarged, schematic and section plan view of the FIGURE 6 assembly as viewed along the section line 7—7 of FIGURE 6.

FIGURE 1 schematically illustrates a helicopter 1 hovering above a predetermined location 2. The location 2 may comprise a point in a combat zone. It is contemplated that the combat zone areas where the invention will be of maximum utility will be heavily vegetated.

The helicopter 1 contains troops and combat cargo. The helicopter will have transported these troops and the cargo from a staging zone to the hovering position shown in FIGURE 1 over ground location 2.

Vertically collapsible or retractable means 3 provide a shielded passageway extending downwardly from the hovering aircraft 1. The lower end of the passage-defining means 3 preferably terminates beneath or close to the tops of adjacent vegetation so as to provide foliage screening adjacent the lower end 3a of the passage-defining means 3.

As shown in FIGURE 2, the passage-defining means 3 comprises collapsible or nestable wall means including a plurality of generally frusto-conical sections 4.

The top section 4a, as shown in FIGURE 4, is provided with an annular flange 5 which rests on the lip or rim 6 of a floor opening 7 in the helicopter 1.

Each of the remaining sections 4b, 4c and 4d is provided with a plurality of eyelets 8. As illustrated in FIGURE 4, the helicopter floor rim 6 may include recess portions 6a and 6b to permit the eyelets 8 to move freely through the helicopter floor while the frustoconical sections 4 are being converged or separated.

A plurality of flexible means, such as chains or cables 9, serve to maintain the sections 4 in their extended relationship shown in FIGURE 2. For example, three such symmetrically arranged cables or chains 9 may be provided, each of which is attached to a lower portion of each section 4. As shown in FIGURE 2, for example, each flexible connecting means 9 may have a plurality of connecting points 9a, 9b, 9c and 9d which are spaced apart a distance substantially equal to, or somewhat less than, the axially vertical length of these sections 4. At connecting point 9a the flexible means 9 is connected by conventional fastening means, such as welding or a fastening bracket, to the lower edge of the frustoconical section 4a. At the connecting points 9b, 9c and 9d, the flexible connecting means 9 is similarly connected with the lower edges of the frustoconical sections 4b, 4c and 4d.

A plurality of second flexible means such as cables 10 are provided to converge or collapse the passage-defining means 3 upwardly so as to bring the sections 4 into the nested relationship shown in FIGURE 5, disposed within the interior of the helicopter 1.

Each such cable 10 is rigidly attached at a lower connecting point 10a to the top annular rim of the lower frustoconical section 4d. Each flexible means 10 passes freely upwardly through apertures 11 and 12 in the eyelets 8 of the sections 4c and 4b, respectively, and through openings 13 in rim 5 at the top of section 4a. Each flexible hoisting means 10 extends upwardly from a top aperture 13 to conventional hoisting means which may comprise a pulley 14 mounted on the roof 15 of the helicopter 1. From the pulley 14 the flexible hoisting means 10 extends to conventional means, such as a winch, not shown.

By simultaneously raising the flexible hoisting means 10, through operating their associated winch means, the extended frustoconical sections 4, which are substantially identically configured, are converged upwardly until they assume the nesting relation shown in FIGURE 5. In this relation, they are supported by the flexible means 10 and disposed within the interior of the aircraft 1.

To re-extend or lower the frustoconical section 4 so as to again define a passage extending downwardly from the aircraft 1, it is merely necessary to lower the hoisting means 10 until the annular rim 5 comes to rest on the helicopter floor rim 6 and the flexible connecting means 9 are fully extended. When this lowering of the flexible hoisting means 10 has occurred, the frustoconical sections 4 will have been separated so as to provide wall means encircling a central passage 16 extending downwardly from the aircraft floor opening 7.

Frustoconical sections 4 may be fabricated of material which is resistant to small arms fire. Thus, the material employed in the fabrication of these sections may comprise bullet-resistant metal, plastic, fabric, or composite materials.

Second means carried by the aircraft 1 define an extensible support 17. As shown in FIGURE 2, this support 17 when extended, projects downwardly from, and is supported by, the top wall 12 of the aircraft 1. The support 17 extends downwardly through the passage 16 and terminates near the end of the passage 16. As illustrated, the support 17 may be disposed coaxially with the frusto-conical sections 4 and may terminate somewhat beneath the lower end 3a of the passage-defining means 3.

The support 17, in the preferred embodiment, comprises a plurality of mutually telescoping and generally tubular members 17a, 17b, 17c, 17d and 17e. Each of these tubular sections may have an enlarged lower end adapted to abuttingly cooperate with an annular rim projecting radially inwardly into the interior of an immediately lower tubular section. Thus, for example, the top tubular section 17a has an enlarged lower portion 18 which provides an upwardly facing annular rim 19. The top of the immediately lower section 17b has a radially inwardly projecting and downwardly facing annular rim 20. Thus, the tubular section 17b may be moved telescopingly downwardly of the upper section 17a until the abutment defining shoulders 19 and 20 are brought into abutting relationship so as to maintain the tubular members in their extended relation.

The top of the uppermost tubular section 17a may be rigidly secured to a bracket 21 mounted on the top wall 15 of the helicopter 1. A cable or similar flexible means 22 may be connected to a fastening 23 disposed at the lower end of the lowermost tubular section 17e. This cable 22 extends freely upwardly from the fastening 23 through the interior of all of the tubular sections 17.

At the top of the uppermost section 17a, a conventional pulley 24 is provided adjacent a lateral opening 25. The cable 22 passes over pulley 24 and laterally outwardly through the opening 25 to conventional hoisting means, not shown, such as a winch.

By raising the cable 22, the tubular sections 17 will be drawn upwardly into the telescoped relationship shown in FIGURE 5, where they are disposed within the aircraft interior.

As will be appreciated, conventional brake means may be associated with the winch means used to operate the cable 22, as well as the flexible hoisting means 10, so as to positively secure the collapsed passage-defining means 3 and the telescoped support 17.

The sections of the support 17 may be re-extended or lowered to the downwardly projecting configuration shown in FIGURE 2 by slacking off on the cable 22 and allowing the sections of the support 17 to extend of their own weight. Alternatively, the lower section 17e may be weighted by attaching cargo so as to cause the gravitational, telescoping separation of these support sections.

The telescoping sections of the support 17 are arranged such that the diameter of the sections progressively increase in a downward direction. Thus, the outer diameter of the lower section 17e is the largest diametered portion of the support 17.

FIGURES 6 and 7 illustrate a cargo lowering arrangement adapted to cooperate with support 17.

This cargo lowering arrangement comprises a cargo pack 26 and associated, resiliently biased gripping means. In the embodiment shown in FIGURE 6, the resiliently biased gripping means comprises a pair of superposed, coaxially aligned, and identical gripping units 27 and 28.

Representative gripping unit 27, as shown in FIGURE 7, comprises a hook-like member 29 having an enlarged end 30 disposed within a channel 31 defined by a housing 32. A coil spring 33 biases the hook end 29a toward a housing defined abutment 34.

Buckled strap means 35 serve to secure the housing 32 to the cargo pack 26, as schematically shown in FIGURES 6 and 7.

The cargo pack is grippingly engaged with the support 17 by pulling the hooks of the gripping units 27 and 28 outwardly so that the support section 17a may be disposed between the hook ends and the housing abutment, such as the hook end 29a and the abutment 34 of the unit 27.

The hook end 29a and the abutment 34 cooperate by resiliently gripping opposite sides of the support section 17a. However, the weight of the cargo 26 is such as to be able to cause the gripping units 27 and 28 to slide downwardly along the support 17.

As the cargo pack 26 slides downwardly along the support 17, the progressively increasing diameter of the tubular sections of the support 17 will cause a progressive increase in the gripping action of the units 27 and 28 resulting from increasing compression of the coil springs of these units. This intensification of the gripping action of the units 27 and 28, as the cargo pack 26 slides downwardly along the support 17, will automatically decelerate the downward rate of movement of the cargo pack 26. In this fashion and by appropriately selecting the strength of the coil springs 33, the cargo packs 26 may be moved downwardly along the support 17 at an initially relatively high rate but will arrive at the lower end of the support 17 at a rate slowed sufficiently to prevent, minimize or reduce damage to the contents of the cargo pack.

The cargo pack 26 may be slid freely off of the unobstructed end of the lower support section 17e. Alternatively, abutment means may be provided on the lower end of the section 17e such that the cargo pack will remain supported on this lower section 17e until manually removed.

With the structures of the apparatus of this invention having been described, the overall methods of personnel and cargo handling involved in the operation of this apparatus may now be reviewed.

The aircraft 1 transports troops and equipment to a site above the specified location 2. The aircraft 1 hovers above this location. The retracted passage-defining sections 4 and the tubular sections of the support 17 are projected downwardly to define a central, slide pole-like, support 17, and an encircling shield 3. Troops may thus slide down the support 17 toward the ground site 2. While sliding thus downwardly, the troops are shielded by the lateral wall means provided by the extended sections 4. The lower end of the support 17 and the lower end of the passage-defining means 3 are at such an elevation as to enable the troops to leave the support 17 in relatively close proximity to the ground 2, preferably while being shielded by adjacent vegetation.

Either before or after the transfer of troops from the helicopter 1 to the ground site 2, cargo is discharged from the helicopter to the site. This transfer is effected by resiliently engaging the cargo packs 26 with the slide support 17 by utilization of the resiliently biased, hook-like units 27 and 28. As the cargo packs move downwardly along the support 17, the progressively increasing diameter of the support 17 progressively compresses the coil springs of the hook-like units 27 and 28. This automatic deceleration, of course, results from the automatic increase in resilient holding force of the units 27 and 28.

While the invention has been described with reference to preferred embodiments, it will be apparent that modifications in the disclosed structures may be employed.

For example, the passage-defining means may comprise a vertically collapsible, fabric-like tube, or may comprise a collapsible bellows-like tube. Under certain circumstances, it would also be feasible to employ telescoping tubular means. Again, under certain circumstances, it might also be feasible to employ a single shield section which could be pivotally carried on the helicopter so as to be moved from a generally horizontally extending storage position to a downwardly extending, personnel and cargo transfer position.

It will also be apparent that a support other than the telescoping tube support 17 might be employed to obtain certain advantages of the invention. For example, a rope-like support might be employed which would have an enlargement formed on its lower end to effect the deceleration of descent of the cargo packs. This enlargement could comprise a downwardly enlarging, conical member coaxially mounted on the lower end of the support.

Although the invention is most uniquely suited to the transfer of personnel and equipment from a hovering helicopter, it may also have applicability in the general transfer of personnel and/or equipment from other forms of vehicles to spaced surfaces or locations.

In describing the structure and mode of operation of the invention, various advantages of the invention have been demonstrated.

Principal advantages reside in the provision of controlled and shielded means for discharging personnel from a vehicle, such as a hovering helicopter. Other principal advantages reside in the provision of a system for effecting the controlled and automatically decelerated movement of cargo from a vehicle, such as a hovering helicopter, to a spaced surface.

The shield and support-defining structures of the invention are characterized by basic simplicity and reliability of operation. Both of these structures may be readily incorporated in conventional vehicles, such as helicopters.

The advantages of the invention are particularly significant in a combat situation where they may serve to effect the expeditious transfer of personnel and equipment from a hovering helicopter to a ground site, while shielding the transfer of such personnel and equipment from enemy observation and while providing some lateral shielding to resist small arms fire.

Those familiar with the disclosure of this invention and skilled in the personnel and cargo handling art may well recognize additions, deletions, substitutions or other modifications with respect to the invention as disclosed which would fall within the purview of the appended claims.

We claim:

1. A combination comprising:
   a hovering aircraft;
   first means carried by said aircraft defining an at least partially shielded passage extending generally downward from said hovering aircraft; and
   second means carried by said aircraft defining a support disposed at least partially within said passage and extending generally downward from said aircraft.

2. A combination comprising:
   a hovering aircraft;
   vertically collapsible wall means carried by said aircraft, said means defining an at least partially shielded passage extending generally downward from said hovering aircraft and,
   second means carried by said aircraft defining a support disposed at least partially within said passage and extending generally downward from said aircraft.

3. A combination as described in claim 2 wherein said collapsible wall means comprises:
   a plurality of at least partially nestable, generally frustoconical sections;
   first flexible means interconnecting said sections when said sections are vertically separated from a nested relationship to define said passage; and
   second flexible means connected with the lowermost of said sections and adapted to exert a lifting force on said lowermost section so as to move said lowermost section upwardly and converge said sections into a nested relationship.

4. A combination as described in claim 1 wherein said second means comprises a plurality of mutually telescoping, generally tubular members, said members being provided with abutment means whereby said members remain interconnected when telescopingly extended.

5. A combination as described in claim 3 wherein said second means comprises a plurality of mutually telescoping, generally tubular members, said members including abutment means to prevent the separation thereof when said members are telescopingly extended; said tubular members being arranged such that the member having the largest diameter is disposed at the lowermost end of said second means when said tubular members are telescopingly extended.

6. A combination comprising:
   a hovering aircraft;
   first means carried by said aircraft defining an at least partially shielded passage extending generally downward from said hovering aircraft and,
   second means carried by said aircraft defining a support disposed at least partially within said passage and extending generally downward from said aircraft, said means comprising a plurality of mutually telescoping, generally tubular members, said members having abutment means whereby said members remain interconnected when telescopingly extended, said members being arranged such that the member having the largest diameter is disposed at the lowermost end of said second means when said members are telescopingly extended.

7. A combination as described in claim 6 further including:
   resiliently biased gripping means; and
   cargo means connected with said gripping means;
   said resiliently biased gripping means grippingly but slidably engaging laterally opposite sides of said second means and being slidable therealong downwardly from said hovering aircraft, with the gripping action of said gripping means increasing as the diameter of the telescoping members of said means increases.

8. A combination comprising:
   an aircraft capable of hovering over a ground location;
   first means carried by said aircraft and adapted to define an at least partially shielded passage selectively extensible downwardly from said aircraft when hovering; and
   second means carried by said aircraft and adapted to define a support at least partially disposed within said passage, said second means being selectively extensible downwardly from said aircraft.

9. A combination comprising:
   an aircraft capable of hovering over a location;
   means carried by said aircraft and adapted to define a support selectively extensible downwardly from said aircraft;
   resiliently biased gripping means;
   and cargo means connected with said gripping means;
   said resiliently biased gripping means being adapted to grippingly but slidably engage laterally opposite sides of said support and be slidable therealong downwardly from said aircraft when hovering;
   said support including a relatively enlarged portion spaced beneath said aircraft and adapted to cause said gripping means to grip said support with an intensified gripping action.

10. A combination comprising:
    a vehicle;
    means carried by said vehicle and adapted to define a support selectively extensible at least partially downwardly therefrom;
    gripping means;
    cargo means connected with said gripping means; and
    a portion of said support adapted to be spaced from said vehicle being adapted to cooperate with said gripping means to increase the intensity with which said gripping means engages said support while sliding therealong.

11. A method of discharging troops into a combat zone, said method comprising:
    transporting troops in an aircraft to a site above a location;
    hovering said aircraft above said location;
    causing said troops to slide downwardly along support means from said hovering aircraft toward said location; and
    laterally shielding said troops while they are sliding downwardly along said support means.

12. A method of discharging cargo from an aircraft, said method comprising:
    transporting cargo in an aircraft to a site above a location;
    hovering said aircraft above said location;
    yieldably and resiliently engaging said cargo with support means whereby said cargo may slide downwardly from said hovering aircraft toward said location; and
    decelerating the rate of descent of said cargo along said support means by increasing the resilient force with which said cargo is engaged with said support means.

References Cited

UNITED STATES PATENTS

| | | | |
|---|---|---|---|
| 1,743,962 | 1/1930 | Fox | 244—115 |
| 2,658,702 | 11/1953 | Osborne | 244—137 |
| 3,072,371 | 1/1963 | Doyle | 244—137 |

FERGUS S. MIDDLETON, *Primary Examiner.*